Sept. 13, 1932.     A. G. F. KUROWSKI     1,876,696
COMBINED TYPEWRITING AND COMPUTING MACHINE
Filed March 12, 1926     8 Sheets-Sheet 3
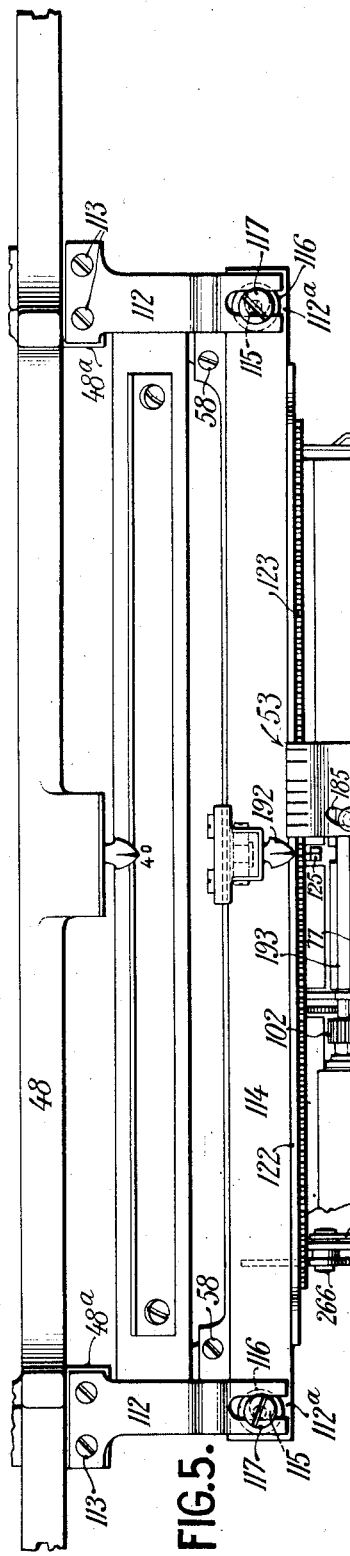
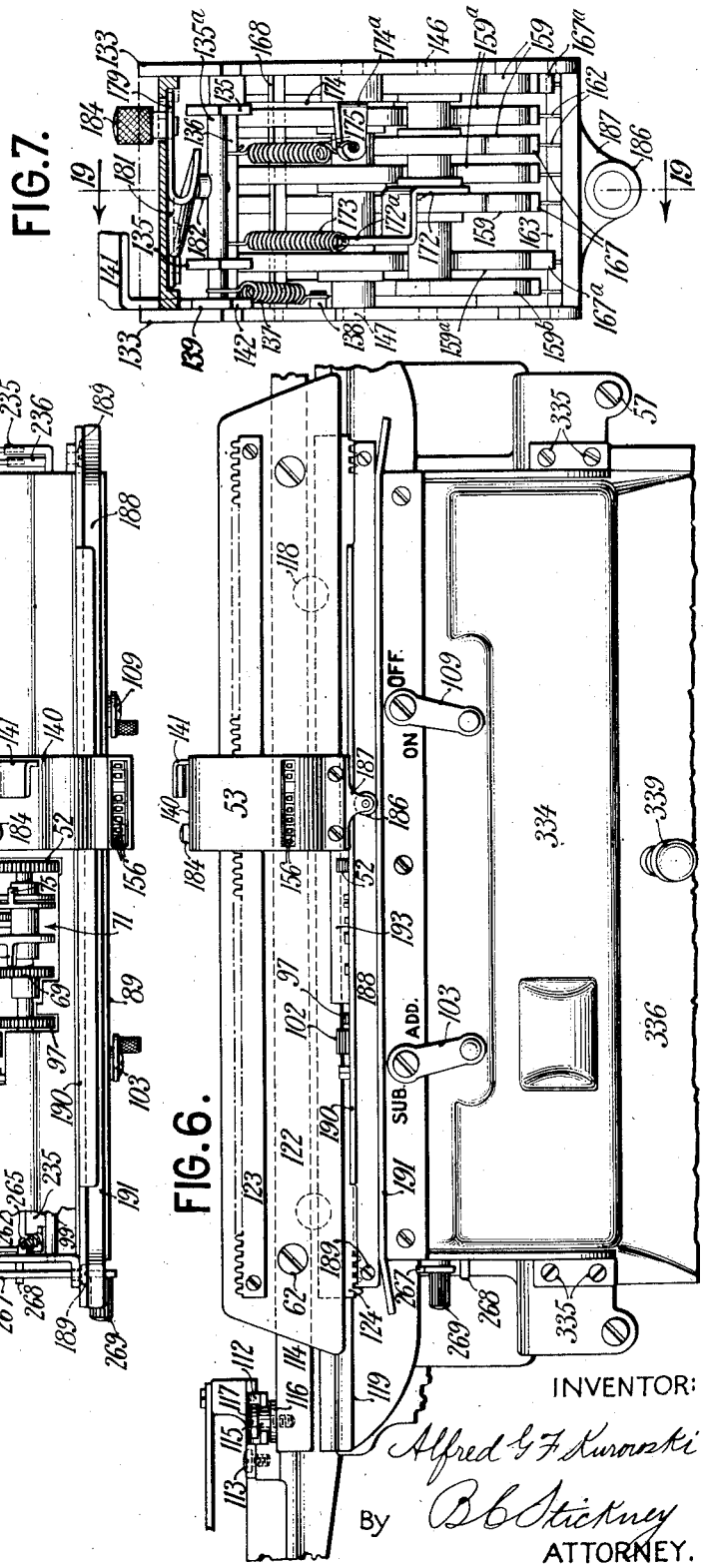
INVENTOR:
Alfred G F Kurowski
By B C Stickney
ATTORNEY.

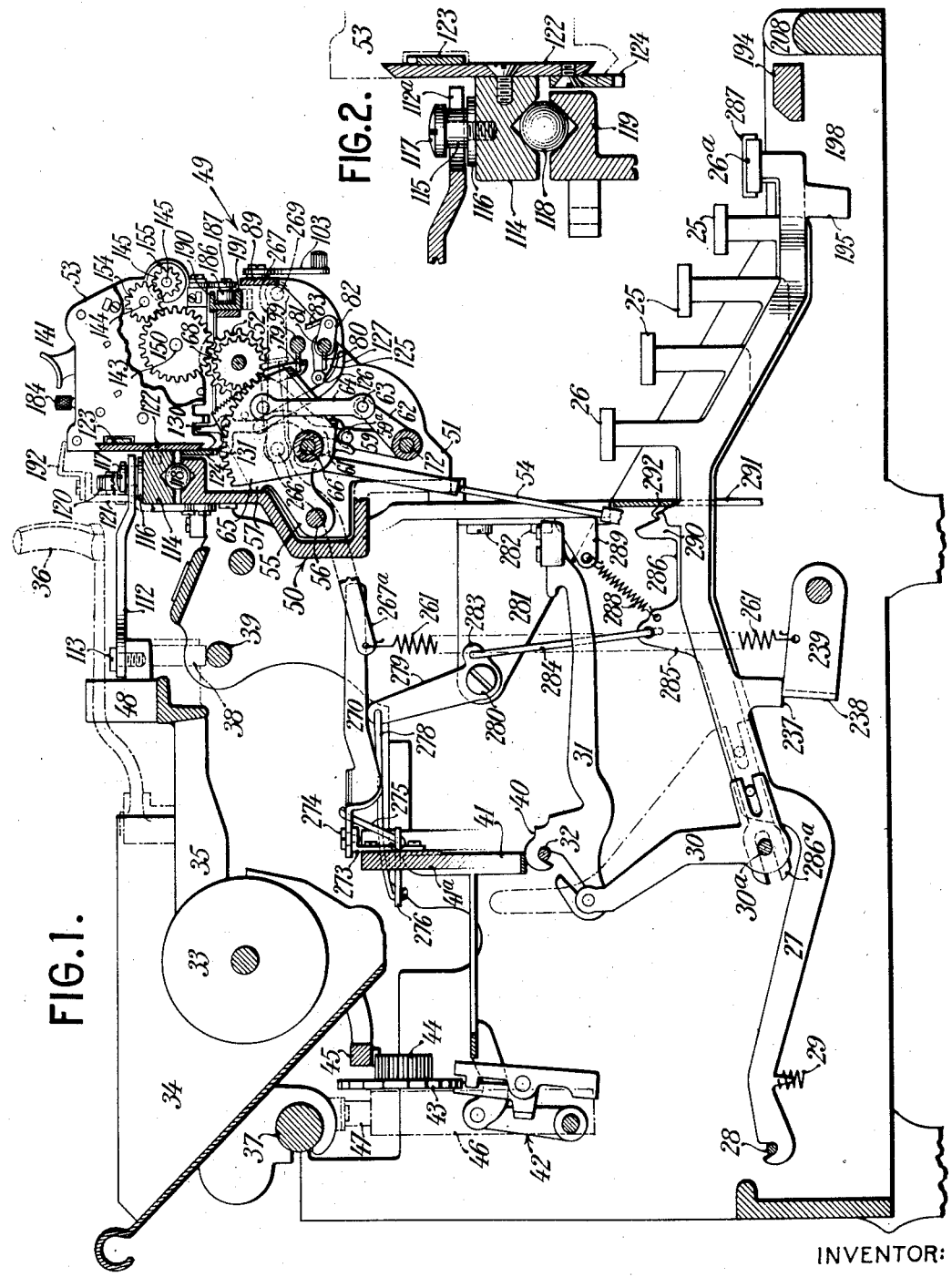

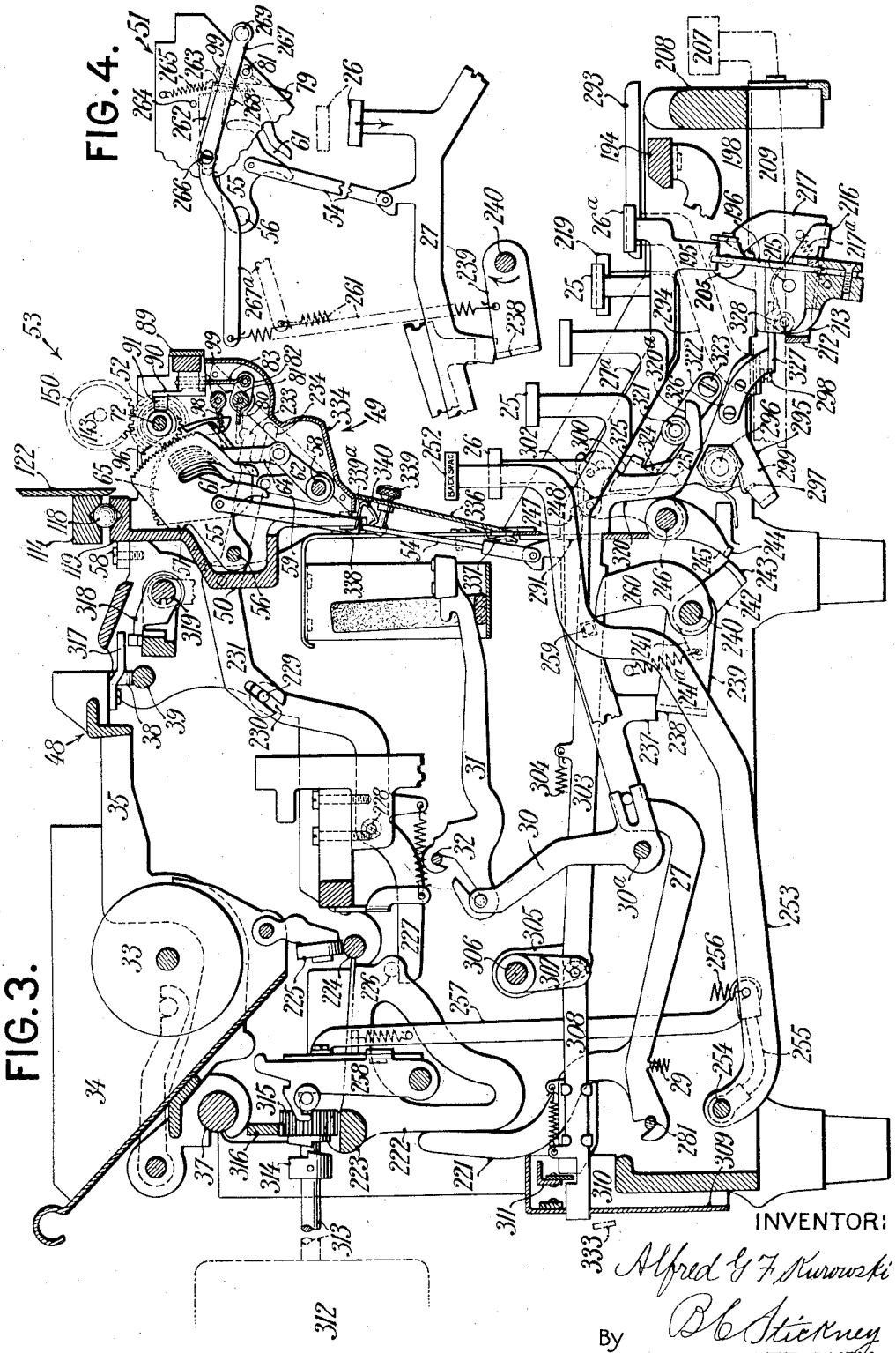

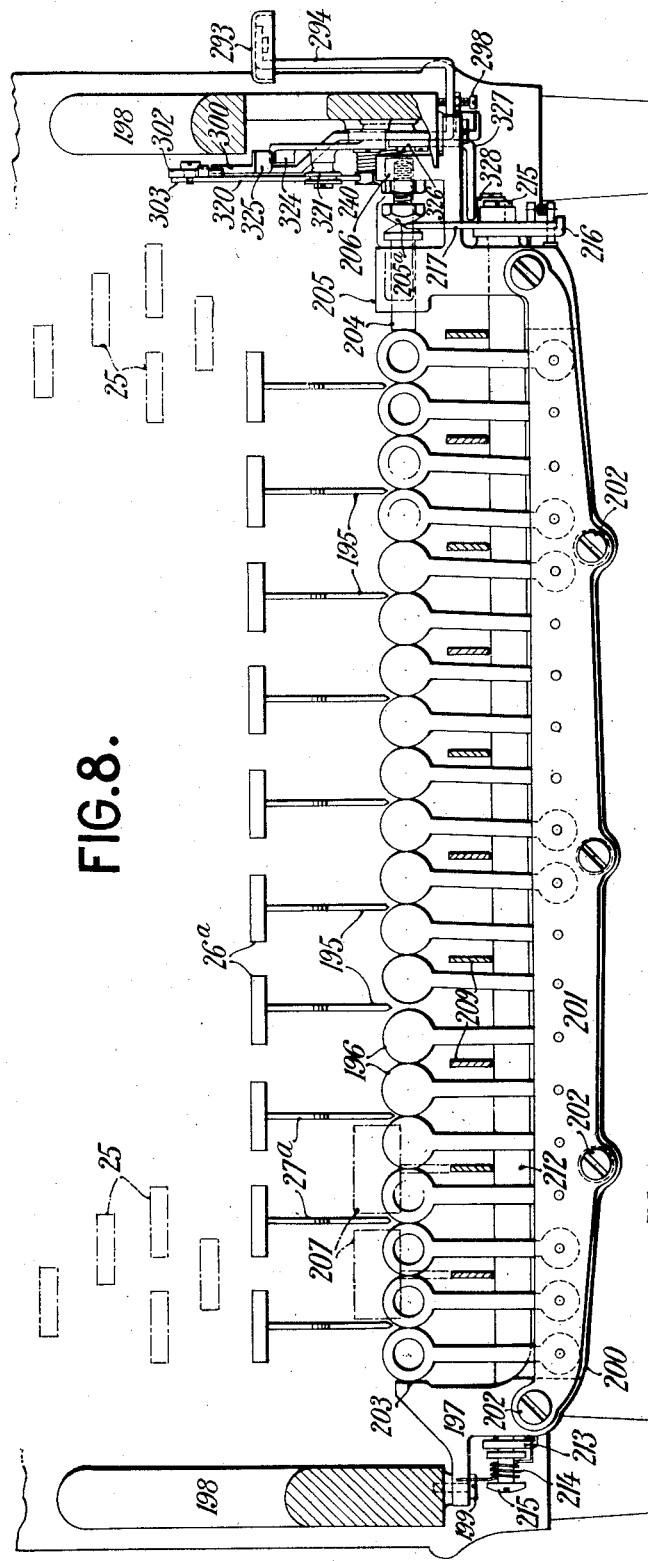

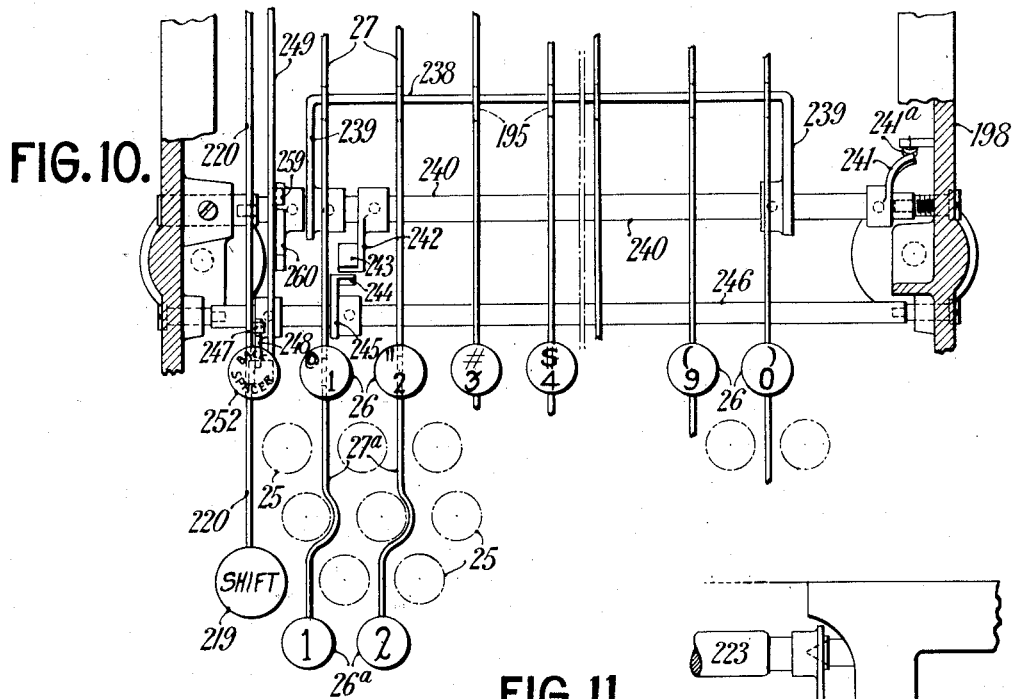
FIG. 10.
FIG. 11.
FIG. 12.
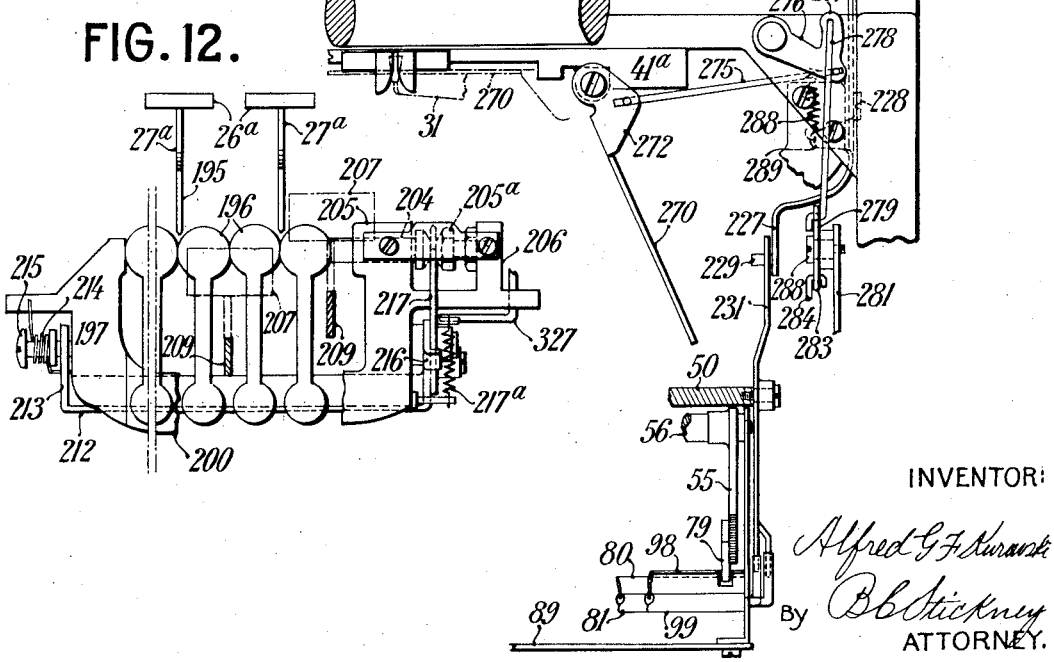

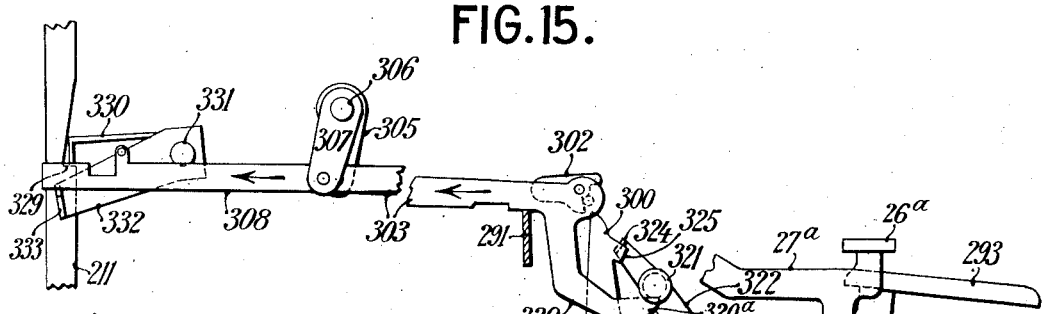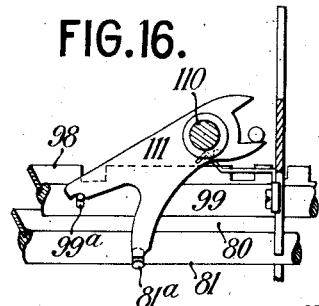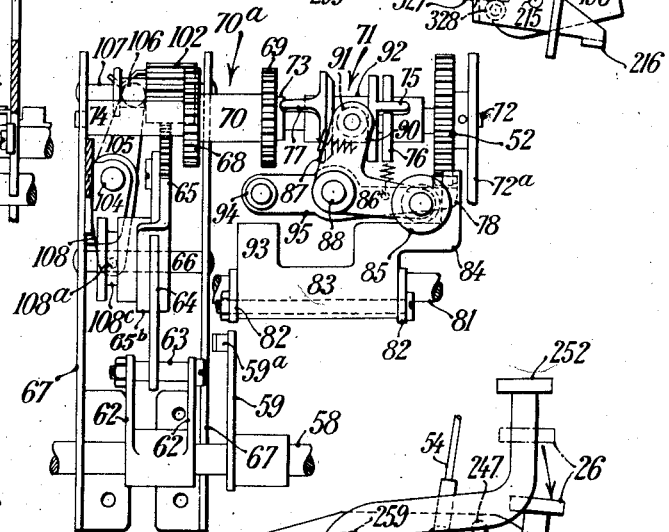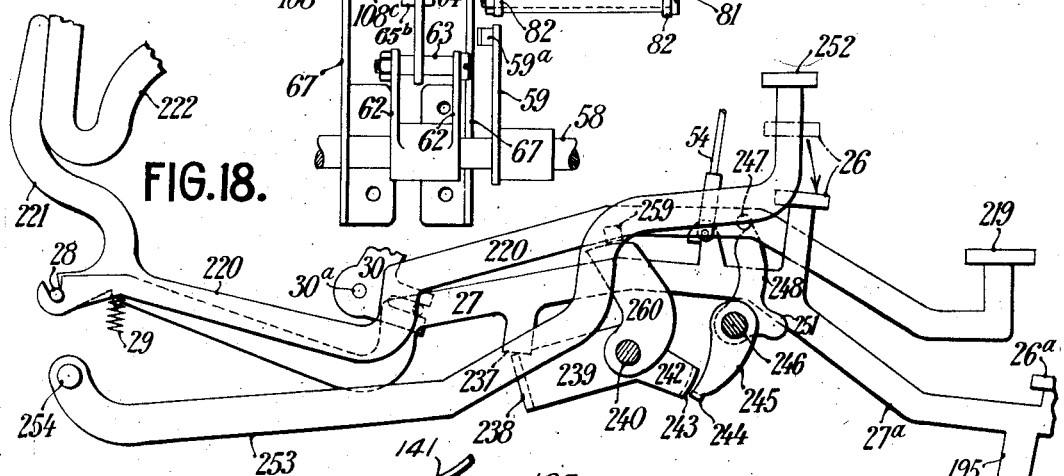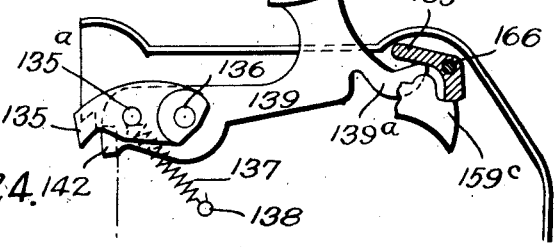

Sept. 13, 1932. A. G. F. KUROWSKI 1,876,696
COMBINED TYPEWRITING AND COMPUTING MACHINE
Filed March 12, 1926 8 Sheets-Sheet 8
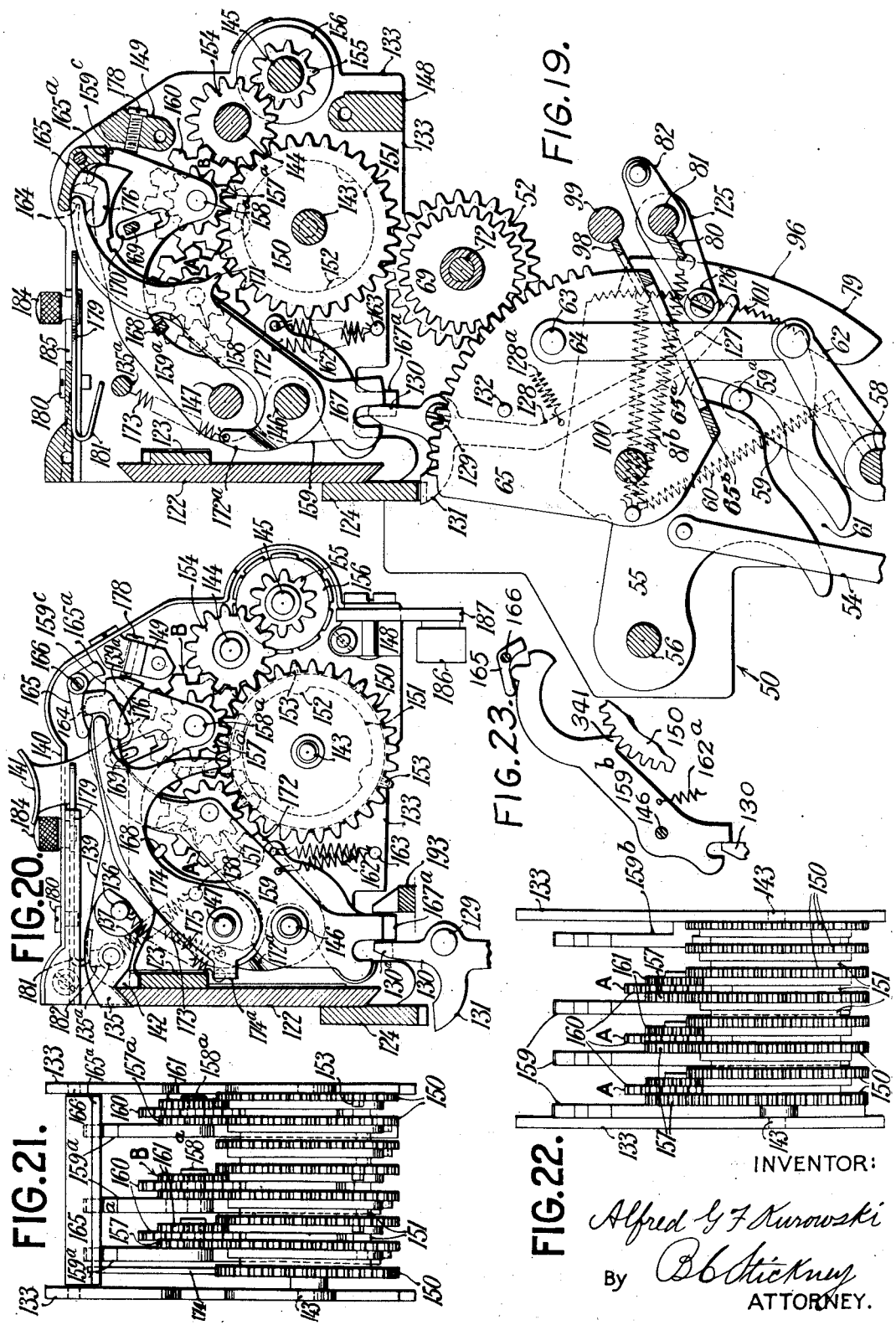
INVENTOR:
Alfred G F Kurowski
By ⌐⌐⌐ Stickney
ATTORNEY.

Patented Sept. 13, 1932

1,876,696

UNITED STATES PATENT OFFICE

ALFRED G. F. KUROWSKI, OF BROOKLYN, NEW YORK, ASSIGNOR, BY MESNE ASSIGNMENTS, TO ELLIOTT-FISHER COMPANY, OF NEW YORK, N. Y., A CORPORATION OF DELAWARE

COMBINED TYPEWRITING AND COMPUTING MACHINE

Application filed March 12, 1926. Serial No. 94,181.

This invention relates to combined typewriting and computing mechanisms, and more particularly to that class of combined machines where a stationary actuator mechanism is operated by the numeral-keys of a typewriter in typing a numeral and registering seriatim the numbers typed within a totalizer movable with the typewriter-carriage step by step through a computing zone, and the present invention may be regarded as an improvement upon my pending application, Serial No. 74,698, filed December 11, 1925, (now Patent No. 1,835,165, dated December 8, 1931) and also as an improvement on the two patents to John C. Wahl, Nos. 893,718 and 893,719, dated July 21, 1908.

In the patent to Wahl No. 893,719 the master gear is first conditioned for an additive or subtractive state by a manually operable gear-shifting mechanism to control the rotary direction of the master-gear, and the computing state of the gear-shifting means is indicated at all times by a visual reading of suitably-inscribed indexing interlocks. The depression of a numeral-key while the totalizer is in a computing zone first actuates means to lock the denominational position of the totalizer to the stationary actuator-frame, to prevent independent carriage-feeding movement thereof until a full computing stroke of the key has been accomplished, and, simultaneously with the locking of the totalizer, to effect a side-shift of the key-actuated driving sector into operative engagement to drive a master-gear. A further depression of the numeral-key actuates differential driving means that predetermine the degree of rotation of the driving sector and the sector-driven master-gear, which will be proportional to the digital value of the key depressed. When rotary movement is conveyed to the driving sector to rotate the master-gear, a full-stroke locking pawl brushes over the peripheral ratchet teeth of a wing-sector rotated by the key to interlock with the pawl and prevent a restoration of the key should the finger leave the key in a semi-depressed position, and provides that the stroke of the key must be completed to correctly type and register a number on the down-stroke of the key. Should the numeral-key be wrongly depressed and the operator detect the mistake before the full down-stroke is completed, Wahl makes provision for a key-actuated means to engage with and lift the full-stroke locking pawl out of engagement with the co-operating teeth of the key-actuated wing, and a spring restores the semi-depressed key and its co-acting parts to normal position. Wahl also shows a master-dog which, by a single vibratory movement, locks the totalizer-truck and releases the carry-over mechanism of the next lower denominational order and co-operates with means on the frame to prevent the actuation of the numeral-key when the totalizer is spaced at a decimal or other punctuation position between denominational groups of figures requiring a punctuation-typing or a space-bar operation to step the totalizer to the next lower denominational position.

In the Wahl Patent No. 893,718 a totalizer is shown slidably mounted upon a truck carried at the front of the carriage, and said totalizer is provided with a locking lever pivoted at one side thereof to lock the totalizer to the truck at any letter-space position by interlocking with rack-teeth on the truck spaced letter-space distances apart. The totalizer further includes a series of register-wheels individually driven by carrying gears that engage with a master-gear seriatim from highest to lowest denominational order through the step-by-step movement of the carriage. Each carrying gear is provided with carry-over mechanism mounted upon supporting arms which are individually spring-pressed to maintain toothed engagement with the carrying gears, and, to condense the assembly of the carry-over members, alternate supporting arms are mounted to vibrate in staggered relation upon two parallel shafts, and, as shown in the Patent No. 893,719, each carry-over arm terminates at a finger below the shafts to be actuated by the master-dog for the purpose of raising the carry-over members, as previously described, to free the active carrying gear from its star-wheel-interlock with the next gear of lower denominational order. The carry-over supporting arms are provided with adjusting stop-screws at their free ends to maintain a toothed transmission of movement between the carrying gears and the carry-over pinions without undue backlash.

One feature of the present invention provides for a positive transmission of movement from the key-actuated cam to the differentially-operated driving gear sector, either downwardly or reversely, without any loss of motion, and the reversal of the carry-over members will be accurately accomplished without requiring a subsequent computing operation to correct the reading of the totalizer. The usual spring-tension for restoring a key and its co-acting parts may not be sufficient to restore a succession of carry-over members, and if the actuation of the error or elimination lever fails to instantly restore the parts, due to insufficient spring-tension, the depressed numeral-key may be raised by the finger, and through the close-fitting, positively-connected intermediate parts, a plurality of reverse carry-over operations can be effected to fully restore the totalizer-wheels to their prior reading. This feature is an important factor in a combined machine that types and computes, as heretofore it has been the practice to finish the stroke of the key without typing, and then restore the register to its former state by a subtractive operation, which must be carefully executed and without typing on the work-sheet.

Another object of this invention provides tooth-aligning means that engage directly with the teeth of the carrying gears, and include toothed arms arranged to engage the carrying gears of highest and lowest order with a third arm operative upon an intermediate carrying gear thus providing a plurality of corrective tooth-interlocking arms distributed along the long row of carrying gears, to remove any spiraling from the digit wheels, as a series, after each carry-over operation and after each master-gear engagement.

Another feature provides that when the case-shift key is depressed, connections are automatically established to simultaneously silence the master-gear, and when it is required that the $, %, or # characters, or any other non-numeral characters, be typed within a computing zone covered by the totalizer, the non-numeral character may be typed without actuating the master-gear, and upon release of the shift-key, the totalizer-actuating mechanism is automatically restored. In this manner it is made possible to prefix the typed numeral with the $-character within a computing zone by the usual manipulation of the case-shift key, and the operator is relieved of all responsibility for correctly typing the numeral and simultaneously clearing the register by a subtractive operation, except to arrest the carriage by a denominational tabulation, one denominational unit higher than the highest digit to be entered into the register, to provide for a letter-space position for the $-character.

Another feature includes a safety-key-locking means to prevent a joint operation of two computing actuator-devices by applying the safety interlocking members under the numeral-key-levers adjacent the position of their keys, and thus arrest a struck key at the seat of the impact before it has transmitted motion to a totalizer-actuator part. The safety locking means include a series of floating vertically-disposed members having a serial endwise contact between fixed stops at each end with sufficient looseness, as a series, to permit the passage of a single key-lever therebetween and check the passage of the second key-lever until the first key-lever has been withdrawn.

The Underwood typewriting machine provides carriage-controlling devices that include a case-shift mechanism, a back-spacing mechanism, a denominational tabulating mechanism and a power-driven carriage-return and automatic line-spacing mechanism. These mechanisms are all key-actuated, and to prevent the accidental depression of these keys during a computing operation, safety means are provided, so that during the actuation of any numeral-key in computing, these several key-actuated mechanisms are all locked and rendered inoperative. Thus, at the initial depression of the numeral-key to compute, the case-shift key is locked, and it will be impossible to accidentally or otherwise type a character other than the numeral that enters into the computation. Similarly, the back-space key is locked, making it impossible to change the denominational letter-space position to which the totalizer is set to a higher denominational position, and the locking of the tabulator-keys prevents the totalizer being shifted to lower denominational positions, and the accidental depression of the carriage-return key during a computing depression of a numeral-key might result in serious injury, or even in fracturing some of the operating parts. Locking these several parts by the initial actuation of any numeral-key to compute, renders all the carriage-controlling mechanisms proof against accidental operation or misuse.

In well-known adding and listing machines, provision has been made for a "non-print" key, to cut out the type-listing elements when the nature of the work requires that only the totals of each series of computations be type listed. This enables the operator to run numeral items into the register for a grand total, which grand total of each series may later be type listed upon the work-sheet upon the release of the non-print key and the simultaneous depression of the elimination key to clear the register. This is one of the most common uses in which an adding machine is employed, because it enters into every department of modern office routine.

Another important feature of the present invention provides that items may be individually type-listed upon the work-sheet without a computation, other items may be type-listed upon a work-sheet with a totalizer computation, or items may be individually entered into the totalizer without type-listing on the work-sheet. This latter feature includes a non-print key, which upon being depressed, does not actuate a complicated mechanism to temporarily sever connections between the typing and computing elements, but operates to throw an obstructive member into the path of the typebars just in advance of the printing position, to prevent typing upon a work-sheet, This simple method, to prevent the typelisting of items simultaneous to their registry into a totalizer, enables the combined typewriting and computing machine to be employed in non-listing computations for a grand total, which grand total may, upon the release of the non-print key and the setting of the actuator mechanism to a subtractive state, be typed upon a work-sheet and the totalizer cleared. This gives to the combined typewriting and computing machine herein-disclosed a greater field of usefulness by broadening its operative scope as applied to modern office accounting practice.

Other features and advantages will hereinafter appear.

In the accompanying drawings,

Figure 1 is a vertical section looking from the left-hand side of an Underwood standard typewriting machine, showing a totalizer adjusted at the front of the carriage, an actuator at the front of the machine-frame over the keyboard, and the several associated typewriter-parts operatively connected thereto, with many of the typewriter-parts omitted for clearness in this view, but which will be shown in another view.

Figure 2 is an enlarged cross-section through the totalizer-truck, showing the manner of suspending and guiding the truck upon antifrictional bearings carried by a rail at the upper side of the actuator-frame.

Figure 3 is a vertical section similar to Figure 1, but showing the power-driven carriage-return mechanism, case-shifting mechanism, tabulator-mechanism, and the key-locking means under the keyboard variously actuated by these mechanisms.

Figure 4 is a view, showing one of the actuator-cams semi-depressed by its key with the error or elimination key depressed to permit the restoration of the cam and its associated parts to normal position.

Figure 5 is a top plan view of the section of the front carriage-rail, showing in detail the manner of hanging the truck from brackets secured to the carriage with a totalizer upon the truck, and portions of the actuator-mechanism including the master-gear and its co-operative parts that change the rotary state of the master-gear.

Figure 6 is a front elevation of the parts shown in Figure 5.

Figure 7 is an enlarged rear view of an assembled totalizer detached from a totalizer-truck.

Figure 8 is an enlarged front elevation on a plane through the machine-frame indicated by the line 8—8 of Figure 3, showing in detail the manner of locking nine numeral-keys when the tenth key is depressed to fill up the gap shown between a series of floating members, and also showing other parts co-operative with the carriage-return key to prevent the actuation of any numeral-key by closing up this open key-gap during the power-driven carriage-return movement.

Figure 9 is a skeleton view, showing how the depression of any tabulator-key operates to lock the numeral-key, and also prevents the actuation of the carriage-return key until the tabulator-key is released.

Figure 10 is a top plan view of the extreme right and left hand portions of the keyboard, showing the manner of securing the several associated parts, including rockshafts, to the two side walls of the frame.

Figure 11 is a skeleton view, illustrating connections from a non-print key that is operative to swing an obstructive bar to intercept the type-bars in advance of the printing position, and enable the operator to render a computation without typing.

Figure 12 is a front view of the extreme right and left hand portions of Figure 8, showing a tabulator-key depressed and the numeral-keys locked by the filling up of the gap between the floating members.

Figure 13:
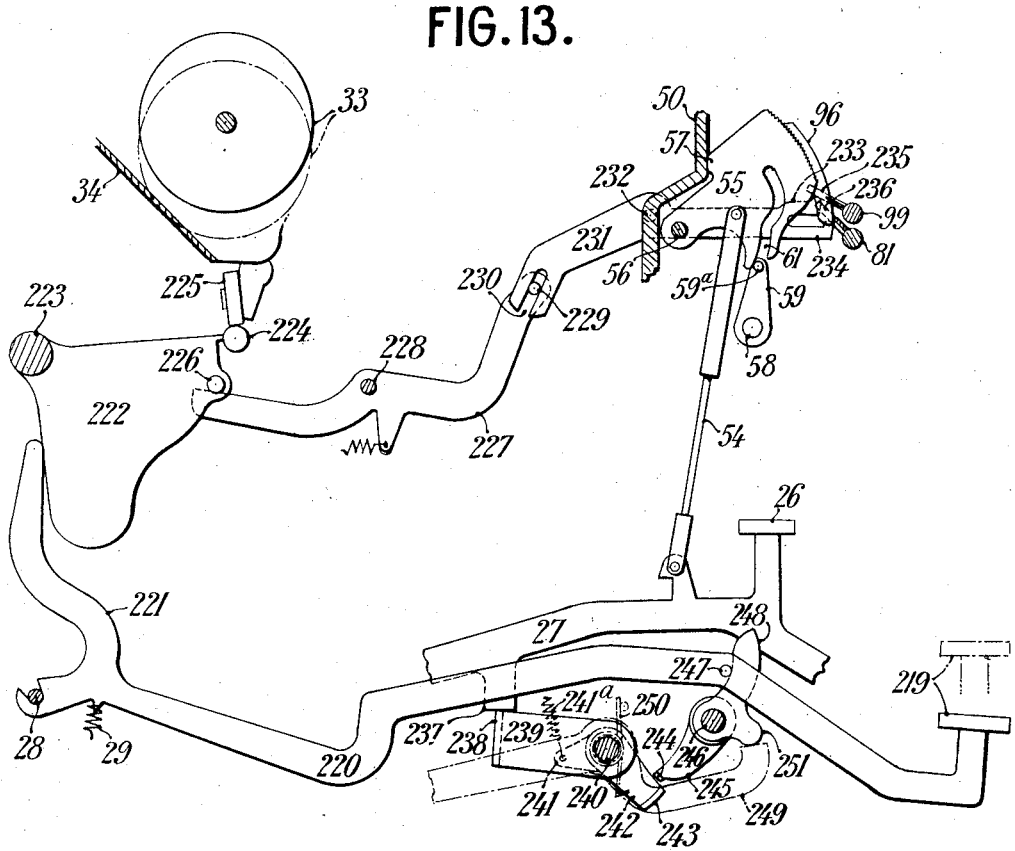

Figure 13 is a skeleton view, showing the case-shift key depressed, the platen raised to the upper-case position, and connections to the actuator to render the master-gear inoperative during the typing of any upper-case character on the numeral-keys, with safety interlocking means to prevent actuation of a numeral-key until the shift-key has been depressed for a full down-stroke against its fixed stop.

Figure 14:
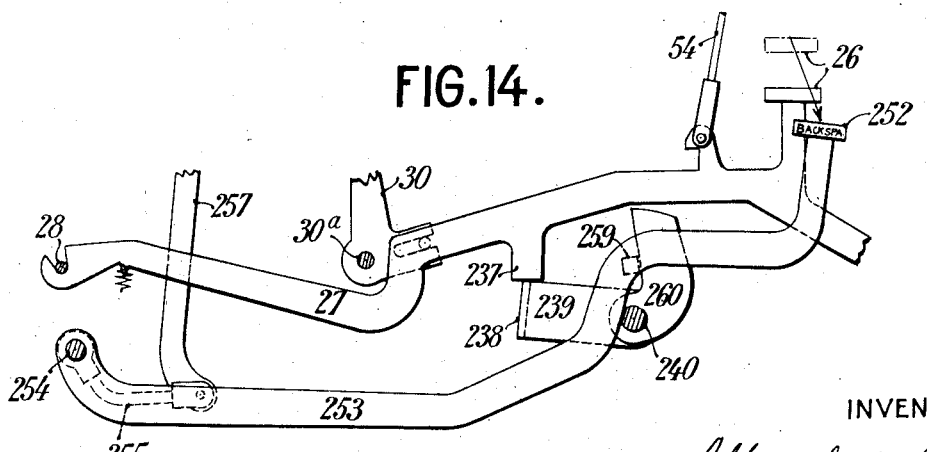

Figure 14 is a skeleton view, showing the back-spacing key depressed with interlocking safety connections to prevent the actuation of a numeral-key until the back-space key is restored to normal position.

Figure 15 is a skeleton view, showing the carriage-return key depressed to close the circuit to the carriage-driving motor, and interlocks established to prevent the actuation of any numeral-key shift-key or back-space key during the interval the carriage-return mechanism is operative.

Figure 16 is an enlarged fragmentary front view with the cover-plate removed to expose the connections that condition the actuator-mechanism to compute or not to compute upon the actuation of a numeral-key to type.

Figure 17 is an enlarged front view of the master-gear and its several control-devices and connections that change the rotary state of the master-gear.

Figure 18 is a skeleton view of a depressed numeral-key, and the interlocking parts moved into positions to intercept the depression of the case-shift-key, the back-space key and the tubulator-keys until the numeral-key has been restored to its normal position.

Figure 19 is an enlarged sectional view of the totalizer on line 19—19 of Figure 7, showing one carrying gear therein in operative train with the master-gear that is also in train with the driving sector that has been partially actuated by the actuating cam connected to a key. This view also shows the master-dog in operative position to lift the carry-over member out of engagement with the carrying gear, and the totalizer-truck is locked to the actuator-frame by the master-locking dog.

Figure 20 is an enlarged end view of the totalizer with the left-hand side plate removed to expose the tooth-aligning arm for the carrying gear of highest denomination and the master-dog in normal position.

Figure 21 is a front elevation of the totalizer, shown at Figure 20, with the cover-plate, totalizer-wheels and intermediate gears removed to expose one set of carry-over members in operative relation without alternate carrying gears.

Figure 22 is a view with the carry-over members, shown in Figure 21, removed to disclose the other set of carry-over members in operative engagement with the alternate carrying gears of Figure 21.

Figure 23 is a side view showing the construction of the aligning arm for the totalizer carrying wheel of lowest denominational order.

Figure 24 is an enlarged end view of the upper portion of a totalizer, showing its latch-releasing lever as also operating the carry-over locking bail, after the totalizer is removed from the machine; some of the parts being omitted for clearness.

The Underwood standard typewriting machine includes alphabet-keys 25 and numeral-keys 26 to operate key-levers 27 extending rearwardly in parallel planes to engage a fulcrum wire 28 under the influence of individual recoil springs 29. Each key-lever is connected to vibrate a bell-crank 30 whose upper end is pivotally connected to a type-bar 31 hung upon a fulcrum wire 32 to be vibrated upwardly and rearwardly against the front face of a platen 33 mounted within a platen-frame 34 carried by a carriage 35 and rotatable step-by-step line-space distances by the usual line-spacing mechanism 36. The carriage 35 at the rear is mounted upon a carriage-rail 37, and the front side thereof is supported by a roller 38 which rolls upon a stationary rod 39 carried by the frame. Each type-bar is formed with a heel 40 to engage with a curved universal bar 41 forming part of a frame which is pivotally connected at the rear to an escapement rocker 42 having the usual escapement dogs to engage the teeth of a ratchet-wheel 43, so as to control the movement of a pinion 44 secured thereto, which is in mesh with a feed-rack 45 carried by arms pivotally connected to the platen-frame ends. To propel the carriage 35 leftward, or in a letter-space direction, a spring drum 46 may be connected by a tape 47 to a convenient part of the carriage.

The computing mechanism includes an actuator 49 having a back bar 50 and ends 51 secured as a unit to the front of the typewriter frame just over the keyboard, and includes mechanism for driving a master-gear 52 to actuate one or more computing heads or totalizers 53 carried by the typewriter-carriage in a manner hereinafter described. The master-gear 52 is connected to be operated by the numeral-keys 26 through distances that vary according to the digital values of the keys. To this end, each numeral-key-lever 27 is connected by a link 54 to an actuating cam-device 55 pivotally mounted as a series upon a shaft 56 supported by the two actuator-frame ends 51. Each cam-device 55 has a stop-face 57 to normally bear against the face of the back bar 50. Upon the depression of a numeral-key, the associated actuating cam-device 55 is swung downwardly about the shaft 56 to actuate a rock-shaft 58 through the medium of arms 59, which are fixed upon said shaft 58 and are held in operative engagement with their cam-devices 55 by a spring 60. The rock-shaft 58 is provided with a series of these arms 59, one arm being associated with each cam-device 55, and the cam-slots 61 therein varying in shape and operative sweep, as indicated at Figure 3, to rock the shaft 58 differentially through varying angular distances. The differential movements of the rock-shaft 58 are transferred to the master-gear 52 through a train of connections including a pair of crank-arms 62 fixed upon the rock-shaft 58 parallel to each other, the free ends thereof being connected by a stud 63 arranged to provide a pivotal bearing for a link 64, which is pivotally connected to a gear-sector 65 mounted to swing upon a suitable stud 66, said stud being secured between two intermediate partition plates 67 which are secured to the back bar 50, and said link 64 may be reinforced by a guide-slot 65ᵃ formed within a ledge 65ᵇ integral with the sector 65.

The sector 65 normally engages with a pinion 68, when the machine is set for addition, which is formed integrally with a similar pinion 69 through the medium of a sleeve 70. The master-gear 52 is normally disconnected from the pinion 69, but, during the initial depression of any numeral-key, said pinion 69 is operative to drive the master-gear 52 through the medium of a clutch 71. The pinion element 70ᵃ, including the pinions 68 and 69 and the sleeve 70, is revolubly supported on a shaft 72 (Figure 17) having bearings in suitable end plates 72ᵃ. Said pinion element is held in position lengthwise of the shaft 72 by means of a collar 73 at one side and a sleeve 74 at the other side thereof. The clutch element 71 is provided at its right-hand side with a tongue 75 engaging in a suitable slot of a driving disk 76 secured to the shaft 72. The master-gear 52 is also permanently secured to said shaft 72, and, when the pinion 69 is rotated, the clutch element 71, having previously been connected therewith through the medium of a tongue 77 entering between the teeth of the pinion 69, is rotated, and the master-gear 52 is also rotated through the same angular distance, which angular distance varies according to the numeral-key depressed.

The master-gear 52 is normally locked by a pawl 78 engaging between the teeth of the master-gear so as to prevent accidental displacement thereof and thus secure alignment of its teeth to those of the carrying wheels of the totalizer. The master-gear 52 is unlocked during the early part of the depression of a numeral-key, but before this unlocking takes place the clutch element 71 is shifted to the left of the position of Figure 17 to fully interlock between the teeth of the pinion 69. This sliding movement of the clutch element 71 is brought about by any one of the numeral-keys, except the "0" key, through the medium of an offset extension 79 (see Figure 1) on each actuating cam-device 55 to engage a plate or blade 80 on a rock-shaft 81 mounted within the two actuator-frame ends 51. This shaft 81 is provided with a pair of arms 82 secured to said shaft and spaced in such a manner as to provide a pivotal bearing therebetween for a connection 83, which performs the function of a thrust-plate provided with an extension 84 engaging within an annular groove of a roller 85 pivotally secured to the face of an arm 86 of a bell-crank 87, which is pivotally mounted upon a stud 88 threaded into a plate 89 extending across the front of the actuator 49 with the ends of the plate secured to the actuator-frame ends. The other arm 90 of the bell-crank 87 is provided at its upper free end with a roller 91 engaging within an annular groove 92 formed within the clutch element 71. Thus, when the shaft 81 is rocked by the offset portion 79, the clutch element 71 is moved leftward from the position in Figure 17 to engage with the teeth of the pinion 69. After the clutch element 71 has been partially connected with said pinion 69, the master-gear 52 will be unlocked by withdrawing the pawl 78 from its engagement between the teeth of said gear. To bring this about, the thrust-plate 83 is provided with a second extension 93 to engage with a roller 94 mounted upon an arm 95 formed integral with the pawl 78, which is pivotally supported upon the stud 88 to be rocked by the extension 79 and withdraw the pawl 78 so as to release the master-gear 52.

While an actuating cam-device 55 is being operated by the depression of its key 26, the connection of the master-gear 52 with the driving mechanism is maintained by means of a dwell 96 on the extension 79, which holds the rock-shaft 81 in its operative position to connect the driving pinion 97 to the master-gear 52. After a number has been run into the totalizer 53, the blade 80 leaves the dwell 96, thus enabling a spring 81ᵇ to restore the rock-shaft 81 and effect the restoration of the clutch 71 to the position of Figure 17, and restore the pawl 78 to relock the master-gear 52. This disconnection is made so as to enable a numeral-key and the connected actuating mechanism to rotate back to normal position without rotating the master-gear, said gear always remaining in the position to which it is rotated during the down-stroke of the numeral-key.

The full-stroke mechanism is provided to compel a full depression of the numeral-keys after they have been partially depressed or semi-depressed, and also to compel a full restoration of the numeral-keys on their return stroke. For this purpose, there are provided locking devices including a blade or longitudinal pawl 98 secured to a rock-shaft 99 taking bearings within the two actuator-frame ends 51. The blade 98 is held in a central position by a spring 100 operative during the movement of the actuating cam-devices 55 in either direction with the longitudinal free edge pointed to engage with peripheral teeth 101 formed upon the edges of the cam-devices 55. Each cam-device 55 when operated engages the blade 98, after which the teeth 101 will brush under said blade, and prevents the return of the key until the key and the connected actuating device have fully passed the effective location of the blade 98. In this manner, the blade 98 interlocks with the teeth 101 of the actuating cam-device upon both its down and return movements.

It will be noted that the studs 59ᵃ on the crank-arms 59 of the differential shaft 58 normally stand radially clear of the cam-slots 61, so that the studs not engaged by a cam-device 55 will swing forwardly with the rock-shaft 58 independently of the cam-devices not operated. It will also be noted that the engagement of a stud 59ᵃ by a cam-device 55 is almost instantaneous with the initial depression of a numeral-key, and when said stud 59ᵃ enters a slot 61 the actuating cam-device 55 has a positive control over the stud and prevents any possible overthrow of the rock-shaft 58 and intermediate connections to the master-gear 52. After each stud 59ᵃ has passed over the camming contour of the actuating devices 55, said stud enters upon a final dwell where the stud becomes inactive, and during this inactive period the master-gear 52 becomes disconnected from its driving pinion 69. The actuator mechanism up to this point is similar to that described in my pending application, previously referred to.

The machine is normally set for addition where the gear-sector 65 engages directly with the pinion 68 to drive the pinion 69 and subsequently the master-gear 52. In order to subtract, it is merely necessary to reverse the direction of rotation of the master-gear, and rotate it subtractively by introducing a pinion 102 between the gear-sector 65 and the pinion 68 on the shaft 72. This pinion 102 is controlled by state-setting mechanism, which includes a control lever 103 outside the casing depending from a rock-shaft 104 and taking a front bearing within the front plate 89 and a rear bearing at the back bar 50.

When the machine is set for addition, the control lever 103 is shifted rightward to the position indicated by "Add", and when the control lever is shifted leftward to the position of "Sub", mechanism has been conditioned to change the direction of rotation of the master-gear 52 for a subtractive transmission. The shifting of the control lever 103 to the left or "Sub" position, Figure 6, rocks the shaft 104 which is provided with an arm 105 having a roller 106 engaging within a groove formed in the hub of the pinion 102 to slide said pinion 102 upon a shaft 107 into engagement with the pinion 68, and, during this sliding movement of the pinion 102, the driving sector 65 is shifted out of engagement with the pinion 68 and into engagement with the pinion 102. As previously described, the driving sector 65 is driven by the link 64 connected to the short stud 63 between the two crank-arms 62 for a slidable movement thereon, and to control this sliding movement of the driving sector, there is provided upon the shaft 104 a downwardly-extending arm 108 having a pin 108ᵃ to engage within an annular groove 108ᶜ within the hub of the driving sector, and hence when the control lever 103 is shifted for a subtractive setting, said driving sector 65 is shifted in a direction opposite to the shifting movement of the pinion 102, so that when said sector releases its rotary control over the pinion 68, the pinion 102 is shifted into engagement with said pinion 68, and in this manner, by the simple movement of shifting the control lever 103 to one of two set positions, the actuating mechanism is conditioned to transmit an additive or subtractive rotation of the master-gear.

It is desirable at times to disconnect the computing mechanism so that the numeral-keys may be operated to type without registering a computation. For this purpose, there is provided a control lever 109, similar to the control lever 103, and secured to the forward end of a rock-shaft 110 (see Figure 16), which latter takes a bearing within the front plate 89 and the back bar 50. The control lever 109 is moved between two positions, indicated as "Off" and "On", and when said lever 109 is shifted to the "Off" position, a two-armed lever 111, secured to the shaft 110, engages pins 81ᵃ and 99ᵃ to rock their respective shafts 81 and 99 to raise the blade 80 on the shaft 81 out of the sweep of the offset extension 79 of the cam-devices 55, and simultaneously raise the blade 98 to an inoperative position relative to the teeth 101 on the said cam-devices, thus rendering these two blades 80 and 98 ineffective, or, in other words, disabling the full stroke device and preventing the cam-devices from actuating the master-gear 52. With this setting of the lever 109 to the "Off" position, it will be understood that the depression of a numeral-key vibrates the cam-actuator devices and the several intermediate connections to the driving pinion 69, but without transmitting motion to the master-gear 52, further details of which may be had from my pending application previously referred to.

Referring to Figures 1, 5 and 6, a front rail 48 of the carriage 35 has ears 48ᵃ to support arms 112 secured thereto by screws 113. The arms 112 project forwardly from the carriage rail 48 and the free ends thereof are bifurcated to adjustably engage with a rail 114, which forms the main part of a totalizer-truck. In assembling the rail 114 to the two arms 112, said arms become rail-driving and not rail-supporting members, and it is desirable that there shall be no independent longitudinal movement which would disturb the letter-spacing synchronism between the rail and the carriage. Either may have a free up or down, or a forward or rearward, movement, independently of each other to compensate for slight variations in parallelism between the one part carried by the carriage and the other part secured to the frame of the machine.

To this end, a slot 112ᵃ in each arm 112 (see Figure 2) receives an eccentric portion 115 of a washer 116 arranged to be clamped to the top face of the rail 114 by a screw 117.

By turning said washer 116 about the screw 117, the eccentric 115 within said slots will take up any longitudinal looseness in the rail between the fixed arms, or the rail may be adjusted bodily to the right or to the left to time the longitudinal position of the rail to the letter-spacing of the carriage-feed-rack for purposes to appear.

To avoid the necessity for exact parallelism between the travel of the totalizer-truck and the travel of the typewriter-carriage, the driving connection between the two arms 112 and the truck 114 is such that the fixed path of the truck may vary slightly from the fixed path of the carriage, without the carriage changing its timing control of the truck. At Figure 2, one arm 112 is shown as having ample clearance space between the washer 116 and the head of a screw 117, so that the arm 112 may rise or drop slightly without throwing a stress upon the rail 114, or the rail may rise and fall slightly without throwing a stress upon either arm 112.

The rail 114 along its lower longitudinal face is formed with V-shaped raceways to receive suitable anti-friction elements 118, which also engage with reverse V-shaped raceways in a rail 119 forming a part of the back bar 50 of the actuator-frame. In this manner the rail 114 is supported and guided through engagement with the anti-friction elements 118 and is movable parallel to and in unison with the carriage. A roller 120 may be pivotally mounted upon a bracket 121 adjustably secured to the back bar 50 midway between the positions of the two antifriction elements 118, and, in this manner, the rail can be suspended and guided by the antifriction elements 118 and held in operative relation therewith by the central roller 120 bearing upon the top face of the rail 114.

At the front face of the rail 114 a flat plate 122 is permanently secured thereto, the upper and lower longitudinal edges of the plate being beveled to form V-guidways to suspend the totalizers 53 over the actuator, the totalizer having suitable V-ways to dovetail with the edges of said plate, and to facilitate the adjustment of a detached totalizer to said plate the upper right and left hand corners of said plate are cut away, as shown, so that the lower V-ways of the totalizer may be first hooked under the lower edge of said plate, and then easily adjusted to the upper V-ways of the plate.

Along the upper front face of the plate 122 (see Figure 2) a toothed rack 123 is permanently secured thereto with the toothed edge parallel to and slightly below the upper edge of the plate. The teeth of the rack have a pitch equivalent to the letter-spacing pitch of the rack 45 of the typewriter-carriage, and are employed to accurately position the totalizer in alignment with the master-gear at any letter-space position of the carriage movement. A second toothed rack 124 is secured to the rear lower face of the plate 122 with the teeth thereof projecting below the lower edge of said plate, and the spacing of the teeth, like the rack 123, is equivalent to the letter-spacing feed of the carriage and is employed to lock the totalizer-truck and totalizer to the actuator-frame by a master-dog, presently to be described.

It will be remembered that the rock-shaft 81 is vibrated by the extension 79 during the initial movement of any cam-device 55, and the actuation of this shaft rocks an arm 125 (see Figures 1 and 19) secured to the shaft and provided with a roller 126 at the free end thereof, to wipe over a cam-face 127 at the free end of a lever 128, pivoted at 129 within the actuator-frame 49 and having a forked formation above said pivot that includes a master dog 130 and another member 131, that operates as a locking dog to interlock with the teeth of the rack 124 at each actuation of the rock-shaft 81 to lock the totalizer-truck and typewriter-carriage against letter-space movement until the completion of the down-stroke of a numeral-key, where the blade 80 of the rock-shaft 81 snaps off the end of the offset member 79, allowing said shaft to be restored by a spring 81$^b$ and the lever 128 to be restored by a spring 128$^a$ against a stop-pin 132, where the locking dog 131 releases a rack 124 to permit a letter-space movement of the carriage during the return movement of the numeral-key.

The totalizers may be like those disclosed in the two patents to Wahl, previously referred to, where the totalizer-wheels are mounted between two side plates 133 in which dovetails are formed to fit the beveled or dovetail edges of the plate 122. The totalizer may be held in position upon the plate 122 by two pressure arms 135 spaced apart by a tie-rod 135$^a$ (see Figures 7 and 20) and carried by a shaft 136 pivoted in the side plates 133 and held in contact with the upper beveled edge of the plate 122 by a spring 137, between the tie-rod and a stud 138 in one side plate 133. A release lever 139 is secured to the shaft 136 and breaks through an opening in the top wall of the totalizer-casing 140 to terminate at a finger-piece 141, which, when depressed, raises the two pressure-arms 135 out of contact with the beveled edge of the plate 122, and the totalizer as a unit may be readily slid along said plate. These two arms 135 have a heavy spring-tension to take up any slack or looseness between the totalizer and plate 122, and, to positively align the totalizer to letter-space positions, the release lever 139 is formed with a tooth terminal 142, which enters between teeth of the rack 123 to prevent lateral movement of the totalizer.

The totalizer side plates 133 serve as supports for shafts 143, 144, 145, 146 and 147, and also support two bars 148 and 149. The shaft 143, which is stationary with the side plates 133, supports a series of carrying gears 150 rotatably mounted thereon, and each gear in the present instance is provided with thirty gear-teeth, a locking disk 151 having three passing or clearance scallops 152, and three carry-over teeth 153. In the plane of each carrying gear 150 an idler gear 154 rotates upon the shaft 144 to transmit the rotary motion of the carrying gears 150 to gears 155 secured to the side face of each totalizer-wheel 156 rotatably mounted on the shaft 145. Each carrying gear 150 is in train with a pinion 157 or 157$^a$ mounted upon a stud 158 or 158$^a$ carried by an arm 159 or 159$^a$ swinging about one of the two shafts 146 and 147.

Rigid with the pinion 157 is a star-wheel 160, which is in the same plane as the locking disk 151, the clearance scallops 152 thereof permitting one step of the star-wheel 160 whenever the same shall have been actuated by the engagement of one of the carry-over-teeth 153 with the gear 150. At other times the star-wheel 160 is held against rotation through the engagement of the concave faces of said wheel with the circular edge face of the locking disk 151. Rigid with the star-wheel 160 and the pinion 157 is a second pinion 161, which serves to transmit a carry-over motion through the pinion 157 to the gear 150 of the next higher denominational order. All these elements 151, 157 and 161 have a unitary movement upon the stud 158 and will be hereinafter referred to as a carry-over unit.

Since a totalizer of this character requires that a number be inserted or run into the totalizer-wheels at each denominational position of the totalizer within a computing zone, it is necessary to provide means for unlocking the carry-over chain of elements at the actuated denominational position. This is accomplished by mounting each carry-over unit upon individual carrying or supporting arms 159 or 159$^a$.

Owing to the limitations of space due to the assembly of the carrying gears 150 to correspond to the usual one-tenth letter-spacing of the carriage-feed-rack, it is necessary to stagger the carry-over units, so that one set of units A, mounted upon the arms 159 that swing from the shaft 146, shall alternate with another set of units B mounted upon arms 159$^a$ that swing from the shaft 147, and each set of carry-over units is held in operative relation with its associated carrying gears 150 by springs 162 individually connected to each arm.

Both series of arms 159 and 159$^a$ at their upper free ends terminate at cam-members 164 arranged to individually actuate a safety bar 165 rocked upon pivots 166 at each side plate 133. This safety bar 165 extends across the entire width of the totalizer and is arranged to be rocked by any arm 159 or 159$^a$, and when so rocked by one of these arms the bar 165 will swing to interlock over the ends of the other arms, to secure or lock the carry-over units mounted thereon in operative mesh with their associated carrying gears 150 when one of the carrying units is raised to permit the actuation of the totalizer.

The release lever 139 has a cam-face 139$^a$ (Figure 20) that will engage the safety bar 165 on the same side as the cam-members 164 of the arms 159 and 159$^a$, to rock the safety bar to the position shown in Figure 19, and thereby lock all the arms 159 and 159$^a$, whenever the totalizer is removed from the totalizer-truck, through the action of the spring 137 raising the cam-face 139$^a$ at the forward end of the lever 139. This prevents accidental displacement of the totalizer elements when the totalizer is temporarily removed from the machine.

Both series of arms 159 and 159$^a$ are formed with a slotted lower extension 167, the slots therein being normally in alignment, so that the movement of the totalizer in letter-spacing will allow the free passage of the master-dog 130, as shown in Figure 20, where the locking dog 131 is disengaged from the rack 124. When the lever 128 is vibrated to the position of Figure 19, the arm 159 is raised through the movement of the master-dog 130 to the position shown, where the associated carrying unit is raised from its carrying gear 150 and the safety bar 165 is shown locking the remaining arms 159 and 159$^a$ where one edge 165$^a$ of said bar has swung over a stop-face 159$^c$ of each of the remaining arms to prevent displacement of their carrying units, while the one arm 159 is held raised by the master-dog 130. It will be noted at Figure 19 that the locking dog 131 is in interlock with the teeth of the rack 124, also that the star-wheel 160 is raised to a position where a locking bar 168, stationary with the totalizer-frame, has passed between two adjoining notches of the star-wheel to prevent accidental displacement of the carrying unit during the interval it is raised and to insure proper tooth-alignment of the pinions thereof when the arm is restored by its spring to re-engage the unit with its carrying gear 150. The series or carry-over units B carried by the arm 159$^a$ when raised, interlock with a second bar 169. each carrying arm having a clearance slot 170 to receive said bar.

The carrying gear 150 of the lowest denominational order has no star-wheel interlock or carry-over unit to normally prevent rotation thereof, and the usual arm 159 is replaced by a special arm 159$^b$ having a single wedging tooth 341 thereon similar to a tooth 171, Figure 19, to engage between the teeth of its carrying gear 150. The arm 159$^b$ is hung upon the shaft 146, and the tooth thereon is forced into engagement with its carrying gear 150 by a spring 162$^a$, and is raised by the master-dog 130 out of engagement with said carrying gear. When the totalizer is positioned at the lowest or hundredths position and when the carrying gear is in mesh with the master-gear, the arm 159$^b$ also interlocks with the safety bar 165 to lock all the other arms 159 and 159$^a$.

As the carrying gear of lowest order is actuated last in every computation, the sudden release of the spring-pressed wedging tooth 171 of arm 159$^b$ between two adjoining teeth of the carrying gear 150 transmits a shock to the whole train of carrying gears, which tends to remove spirality that may exist after several carry-over operations. A single tooth of this character is sometimes insufficient to jar a long series of totalizer-wheels into alignment, especially when the digit typed in a hundredths position is a cipher and no rotary movement is conveyed from the master-gear to the carrying gear 150. In such an instance the special arm 159$^a$ is raised and drops between the same two teeth of the undisturbed carrying gear, and no corrective effect takes place in the gears by the transmission. To further eliminate the spirality from the carrying gear 150 a special arm 172, Figures 7 and 19, is assembled upon the shaft 146, at a central position of the totalizer, as between the tens and hundreds carrying gear and spring-pressed into engagement therewith by a spring 173. This arm 172 is not actuated by the master-dog 130 but the free end of the arm underlies the edge of the safety bar 165, as shown at Figure 19, with a finger 176 secured to said bar to underlie the end of the arm 172. In this instance the safety bar 165 is not rocked by the arm 172, but the forward end of said arm is raised by the rocking movement of the safety bar at every actuation of the arm 159 or 159$^a$. Hence when carrying operations take place above the hundreds position, the registering of each digit causes the arm 172 to rise and drop, to jar the carrying gears 150 and assist in correcting the alignment of the totalizer-wheels. As shown at Figure 20, a third tooth-aligning arm 174 is hung upon the shaft 147 in alignment with the carrying gear of the highest denomination, and, like the arm 172, has an interlocking engagement between the safety bar 165 and the finger 176, and the wedging tooth thereon being held in operative engagement between teeth on its carrying gear 150 by a spring 175 connected between the offset end 174$^a$ thereof and the shaft 136. In this manner any spirality that may develop in the carrying gears 150 is corrected at three different positions by a wedging tooth carried by the three arms 159$^b$, 172 and 174. It will be noted, at Figure 7, that both arms 172 and 174 have offset ends 172$^a$ and 174$^a$ to position the springs 173 and 175 where they will not interfere with the actuation of certain arms 159$^a$.

It is essential that the carry-over units shall engage with their associated carrying gears 150 and disks 151 without grinding contact from the tension of their springs 162, and to relieve said units from this abnormal pressure the bar 149 has adjusting set-screws 178 threaded therethrough, with the ends thereof abutting the ends of the arms 159 and 159$^a$, there being one screw 178 for each arm, and each arm may be finely adjusted to maintain the proper pitch-line engagement between the carrying gears 150 and the associated carry-over units, regardless of the tensions of the springs 162.

To prevent the displacement of the totalizer through the accidental depression of the release lever 141, means are provided for locking the lever, as by a member 179 pivotally hung from the under face of the top section of the totalizer-frame by a screw 180. This member is formed with a tongue bent U-shaped, as at 181, to form a resilient flat face to wedge between a stud 182, Figure 7, on the tie-rod 135$^a$ and the totalizer-frame. To actuate the member 179, there is provided a finger-piece 184 that passes through a slot 185 in the top face of the casing 140.

The totalizer-unit 53, overhanging from the plate 122, would place unnecessary strain upon the antifriction roller 120 bearing upon the upper face of the rail 114, and to relieve said roller from this strain, each totalizer is provided with a roller 186 pivotally mounted to the inside face of a bracket 187 secured to the cross-bar 148. This roller 186 drops below the lower edge of the totalizer and projects rearwardly from the bracket to enter and engage within a channel-bar 188 secured at each end by screws 189 threaded into the ends 51 of the actuator-frame 49. The channel-bar 188, as shown at Figures 5 and 6, comprises two parallel ledges 190 and 191 with a separating space equivalent to the diameter of the roller for a running fit, the upper ledge 190 preventing the totalizer from being raised, and the lower ledge 191 forming a rolling track for the roller. The dovetail interlock between the totalizer and the plate 122 makes the operation of assembling a totalizer more or less difficult, and, as already described, the upper corners of said plate 122 are cut away, so that the lower end of the totalizer may be first adjusted to the plate, which assists in guiding the upper end of the totalizer to the upper edge of the plate 122, and to further assist the assembly of the totalizer to the end of the truck, the end section of the upper ledge 190 is removed, so that the roller 186 does not enter the channel-bar 188 until the totalizer has been fully assembled to both edges of the truck.

The front support of the Wahl totalizer includes a straight edge or track that is adjustably secured to the totalizer to ride over a roller pivotally mounted to the stationary actuator-frame. This construction requires individual adjustment of each totalizer to a machine, and totalizers will not interchange with other machines except through re-adjustment of this track. Moreover, the roller on the actuator is not effective to relieve the overhanging strain of the truck, except when the totalizer is passing through a computing zone, and the raising of the totalizer and the vibration of the loosely-hung totalizer-truck in riding over the roller during the movement of the totalizer in entering the computing zone, add to the burden of the carriage-motor. By the employment of the long channel-bar 188, the roller 186 is always in engagement with the lower ledge 191, and the carriage movement is uniformly smooth throughout. Moreover, by mounting the roller 186 to the totalizer, the assembly of the bracket 187 is a factory gaging and assembling operation and interchangeability of the totalizers is assured.

The upper rear edge of the totalizer-casing 140 has denominational letter-space graduations to guide the setting of the totalizers to a pointer 192, indicating the printing position of the types.

It will be noted, at Figures 7 and 20, that the tongues 167ª formed by the slots in the extensions 167 vary in length and drop, and that the master-dog 130 has a stepped face 130ª. This combination of parts affords means to provide for a check to the forward movement of the master-dog 130, to prevent actuation of the master-dog at the decimal position, which position requires a space-bar operation to carry the totalizer to the next lower denominational position, the master-dog co-operating with a bar 193, secured to the top of the actuator, and having a transverse clearance slot to permit the passage of only one extension 167, in a well-known manner, to provide for a letter-space gap in the totalizer-wheels to separate the dollars from the cents.

Each numeral-key-lever 27 is formed with a forward extension 27ª, to provide for a second row of numeral-keys 26ª between the lower bank of character-keys 25 and a space-bar 194, and to provide an upper bank of keys for typing numerals, and a lower bank for typing and computing numerals, as set forth in my pending application referred to. Each numeral-key-lever 27 is formed with a depending tongue 195 positioned to pass between two of a series of cam-elements 196. Referring to Figure 8, the manner of suspending the cam-elements 196 includes a yoke-piece 197, secured to the lower edge of each machine side wall 198 by screws 199 to form a bridge across the keyboard. The yoke 197 may be in the form of a casting with a recess 200 formed by machining away the front vertical face of the yoke, and securing a cover-plate 201 thereover as by a series of screws 202 threaded into the front face of the yoke, the recess and plate forming a long pocket or channel within which the lower ends of the cam-elements 196 may be pivotally hung in vertical relation to each other, the side walls of the channel serving as guide faces to hold the cams in uniform vertical planes. The upper ends of these cams are circular in form and have a continuous side edge contact, as a series, between a fixed abutment 203, at the left-hand side of the yoke 197, and a right-hand abutment against a plunger 204 horizontally slidable through a lug 205 of the yoke, with a working space between the series of cams to permit the passage of the tongue 195 of a single numeral-key-lever. This working gap is made adjustable by a set-screw 205ª threaded into an adjacent lug 206 in the yoke, to abut the outer end of the plunger 204.

In prior combined typewriting and computing devices, the preventive interlocks for the numeral-keys are assembled within the actuator, and the depression of a second numeral-key before a depressed key has been fully restored will cause the parts intermediate the key-lever and the interlocks to be sprung and subjected to an undesirable strain. Positioning the preventive means directly under the point of finger-impact at the keyboard, checks the impact before any movement can be transmitted to the actuator.

A machine of this character is usually supplied with denominational tabulating means operated by keys 207, positioned outside a front bar 208 of the frame and provided with levers 209 fulcrumed at 210 with their rear ends arranged to lift a stop-bar 211 into the path of a carriage-stop, not shown. When said keys are depressed, as shown at Figures 8 and 9, the levers 209 pass rearwardly between the cams 196 to rest upon a universal bar 212 extending under the whole series of levers 209, with their free ends bent at right angles to form side arms 213, which are pivoted to the outer faces of the yoke 197 and held raised against the levers 209 by a spring 214 coiled about one of two pivot-screws 215. The right-hand arm 213 is formed with a bent-over ear 216 to underlie the lower edge of a cam-lever 217 hung upon one pivot-screw 215, and having a tongue 218 radially aligned between the head of the plunger 204 and the head of the set-screw 205ª to fill up the gap between the series of cams 196. To promote a ready entrance of the tongue 218, the adjacent edges of the head of the plunger 204 and the head of the set-screw 205ª may be beveled off, as shown. Thus when the denominational tabulating key is depressed to release and tabulate the carriage, the universal bar 212 will be swung to the position in Figure 9, and when the tongue 218 has passed between the fixed abutment of the screw 205ª and the head of the plunger 204 to close up the gap in the cams 196, the depression of any numeral-key is prevented, as shown at Figure 12, until the tabulating key 207 is fully restored and the tongue 218 withdrawn from the gap as by a suitable spring 217ª. Similarly, if a numeral-key lever 27 is depressed, the gap between the cams 196 will be closed, and the depression of a tabulating key 207 will be prevented because of the inability of the tongue 218 to pass between plunger 204 and set-screw 205ª.

All numeral-keys 26 are inscribed with a numeral for the lower-case position and some non-numeral characters for the upper case shift, like the sign for dollars ($) on the "4" key, and the sign for number (#) on the "3" key. It is necessary many times to print the sign for dollars within a computing zone, and case-shifting the platen or segment, would ordinarily run the numeral "4" into the totalizer, and provision has heretofore been made to employ a "disconnect" key to sever the connection between certain parts of the actuator mechanism to silence the master-gear, and after the typing of the $-character the "disconnect" key must be restored, two operations that are liable to result in error or confusion.

For the purpose of the present invention, a standard shift-key 219 is carried by a key-lever 220 pivoted to the rod 28 and formed with a crank-arm 221 engaging a frame 222 that swings with a rock-shaft 223 pivoted in the frame-ends. This frame 222 carries a rail 224 upon which a center roll 225 of the platen-frame rides in both upper and lower case positions. The frame 222 carries a stud 226 against which a lever 227 is spring-pressed to vibrate about a pivot 228 and follow the up-and-down movement of the stud 226 during a case-shift movement of the platen. The forward end of the lever 227 has a stud 229 to engage within a slot 230, formed in the rear end of a lever 231 pivoted at 232 to the outer face of the right-hand actuator end 51. The forward free end of the lever 231 is bifurcated to form a fork having two prongs 233 and 234 positioned to underlie crank-arms 235 and 236 carried by the two rock-shafts 99 and 81, respectively. When the shift-key 219 is depressed, as at Figure 13, the platen is shifted to the upper-case position, and the intermediate levers 227 and 231 actuate the two prongs 233 and 234 to raise the two crank-arms 235 and 236, to rock the shafts 99 and 81, and their associated blades 98 and 80 are vibrated, one out of the path of the teeth 101 of the cam-devices 55, and the other out of the path of the dwell 96, with the result that, during the upper case-shift movement of the platen, the full-stroke device for the numeral-keys is rendered inoperative, and the connection between the master-gear and the pinion 69 is void, and the depression of the "4" numeral-key to type the sign for dollars does not actuate the master-gear, and immediately after the release of the shift-key, the rock-shafts 99 and 81 are restored by their springs 81ᵇ and 100 to normal positions.

To prevent the actuation of a numeral-key 26 during the depression of the shift-key 219, or to prevent the depression of the shift-key during the actuation of the numeral-key to type or compute, each numeral-key-lever 27 has a lug 237 at the under edge, to engage with a universal bar 238 formed with turned-over ends 239, and is secured to a rock-shaft 240 having a bearing in the frame sides. The shaft 240 has a crank-arm 241 provided with a spring 241ª that holds the universal bar 238 against the lower faces of the lugs 237 under tension. An arm 242 secured to the shaft 240 formed with a turned-over end 243 vibrates with the shaft to clear a turned-over end 244 of an arm 245 secured to a rock-shaft 246. The shaft 246 may be rocked by a stud 247 on the shift-key-lever 220 to engage a cam-arm 248 fixed to the shaft 246. To maintain the arm 248 against the stud 247 in all positions of the key-lever 220, a lever 249 mounted for a free movement upon the shaft 240 is provided with a spring 250 to raise the forward end thereof to abut a short arm 251 forming a part of the cam-arm 248. The depression of the numeral-key vibrates the universal bar 238 to rock the shaft 240 to vibrate the arm 242 that just clears the turned-over end 244, as shown at Figure 13, and should the shift-key 219 be depressed during the prior depression of a numeral-key, the rocking of the shaft 246 will be checked through the blocking of the arm 245 by the turned-over end 243, also shown in this figure. The depression of the shift-key 219 initially vibrates the turned-over end 244 of the arm 245 across the path of the turned-over end 243 of the arm 242, to prevent the depression of the universal bar 238 by a numeral-key until the shift-key has completed its return stroke and the obstructive face of the turned-over end 244 has passed inside of the sweep of the end 243, to prevent vibration of the universal locking bar 238.

A back-spacing key 252 is carried by a lever 253 secured to a rock-shaft 254 that carries a center crank-arm 255 lifted by a spring 256 and having a connection 257 to the well-known back-spacing device 258 that operates to back-space the carriage in the usual Underwood manner. It is desirable to prevent any back-spacing operation during the manipulation of the numeral-key to type and compute. To this end, the lever 253 has a stud 259 at the side thereof to normally clear an arm 260 fixed to the shaft 240. When the back-spacing key is depressed, as at Figure 14, the stud 259 is swung downwardly to a position to intercept a swinging movement of the arm 260 and the rock-shaft 240, to prevent actuation of the universal bar 238 by a numeral-key 26, or with the arm 260 positioned, as at Figure 18, by a depressed numeral-key the rocking of the shaft 240 by the universal bar 238 swings the arm 260 under the stud 259 to prevent an actuation of the back-spacing key, and the end 243 of the arm 242 is swung to intercept a swinging movement of the arm 245, and thus prevent the depression of the shift-key 219.

It is desirable that, while the actuator parts are partially operated, as shown at Figure 4, to condition certain parts to be restored by raising the blade 98 out of engagement with the cam-devices 55, the several parts connected thereto will be restored to normal, including a negative rotation of the master-gear that is in operative train with a totalizer-wheel. To this end, there is pivoted on the inside face of one actuator-frame end 51 a lever 262 having a bent-over lip 263 positioned to engage with the blade 98 to be normally held in inoperative position against a stop-pin 264 by a spring 265. The lever 262 is secured to the inner end of a stud 266 that takes a bearing in the end 51 with the outer end thereof suitably secured to a lever 267, said levers 267 and 262 having a unitary movement and being arrested in one position by the pin 264, and at the down position of the lever 267 by a pin 268. When the lever 267 is depressed by a finger-piece or error-key 269 from the position of Figure 1 to that of Figure 4, the blade 98 is forced out of engagement with the peripheral teeth of the cam-elements 55, and the spring 60 restores the associated parts to normal positions without entering the partial computation.

It may happen that the partially-depressed key has effected a carrying movement to one or more higher denominational totalizer-wheels, and when the parts are to be restored back to normal and it is necessary to effect a reversal of the carrying elements, the spring 60 may be deficient to effect this extra movement, as it is desirable that the spring-tension shall not overburden the numeral-keys. It will be remembered that the universal bar 238 is actuated by all the numeral-keys, and said bar is restored by the spring 241ª and supplements the spring 60 in restoring the typing and computing members. To increase the power for restoring these several parts during the interval the lever 267 is depressed, a supplemental spring 261 may be connected between the universal bar 238 and an arm 267ª of the lever 267. The tension of the spring 261 at the normal position shown in dotted lines, Figure 4, is practically without tension, so as not to increase the normal resistance of the universal bar 238, but, when the lever 267 is depressed to erase the set-up state of the computing parts, the arm 267ª is shifted from the dotted-line position to the full-line position, Figure 4, which places the spring 261 under a higher tension to restore the actuator parts. Should this spring-tension at any time prove to be defective in restoring a semi-depressed key and its associated parts, it will be noted that through the positive transmission between the cam-devices 55 and the roller-actuated differential shaft, any semi-depressed numeral-key may be restored manually by a finger-lifting movement of the key while the lever 267 is held depressed.

The combined machine so far described provides for a typing or for a combined typing and computing operation. In some classes of work it is desirable to enter sub-totals into the totalizer without typing the items, to provide a grand total which will be typed in a single line, as for a daily statement. In all standard typewriters the transmission of the key-lever to the type-bars is so arranged that the type-bar depends upon its own inertia to actually reach the platen to type, and hence there is a short interval just before the type-impact when the key has completed its full down-stroke, and if a thin obstruction is placed in front of the platen to arrest the type-bar just in advance of the type-impact, the arresting of the type-bar will not interfere with the carriage-feed movement, nor with the computing mechanism.

To this end, there is shown, at Figures 1 and 11, an arm 270 which may be swung from an inoperative position at the side of a segment 41ª to the dotted-line position of Figure 11, to intercept each type-bar. The arm 270 may be made of thin metal and formed with an ear 272 at right angles thereto, which is pivotally secured to a bracket 273 by a screw 274, said bracket being secured to the face of the segment 41ª. The arm 270 may be swung between the two positions of Figure 11 by a link 275 connecting the ear 272 with a crank-arm 276, fulcrumed upon the segment 41ª and formed with an arm 277 connected by a link 278 to the upper end of a bell-crank 279 hung upon a screw 280 threaded into the rear end of a bracket 281 secured to the frame by screws 282. The bell-crank 279 has a short arm 283 connected with a link 284 to an ear 285 upon the upper edge of a key-lever 286 formed with a bifurcated end 286ª fulcrumed upon a bell-crank fulcrum wire 30ª, and provided with a non-print key 287 at the keyboard. It will be noted that (Figure 1) the ear 285 of the lever 286 has a spring 288 connected to an ear 289 on the bracket 281 in such a manner that the lever 286 is held in a raised position, and said lever may also be drawn forwardly by the tension of the same spring. When the key 287 is depressed, the lever 286 swings about its fulcrum 30ª, and the arm 270 is swung to the dotted-line position in Figure 11. The downward swing of the key 287 causes a latch ear 290 on said key to be drawn forwardly by the spring 288 to pass under the edge of a comb-plate 291 secured to the frame, where a notch 292 engages with the comb-plate to prevent the key 287 from being restored by the spring 288 when the key is released, with the effect that the arm 270 has been shifted to intercept all type-bars to prevent typing. Thus during the interval that the key 287 is mechanically held depressed, a numeral-key may be depressed to actuate the master-gear and run digits seriatim into the totalizer through the letter-spacing movement of the carriage, for the purpose of establishing a grand total without typing. When the grand total is completed the key 287, which is in a depressed position, may be pushed rearwardly by the finger of the operator to release the interlock between the notch 292 and the comb-plate 291, and the spring 288 restores the key 287 and the arm 270 is withdrawn to permit typing.

A single-line entry may now be typed by the alphabet-keys up to a computing zone, the state-control set to subtract, the totalizer positioned denominationally, and, in typing the grand total from a reading of the totalizer, the totalizer is cleared in a well-known manner.

It is a desirable feature in a combined machine of this character to include means operable by the keyboard to effect a power-driven carriage-return movement that automatically line-spaces the platen, and thereby enables the operator to have full and complete control of the carriage without removing the hands from the keyboard. To this end, see Figures 3, 8 and 15, a carriage-return-key 293 may be arranged outside the right-hand side of the frame, and includes a lever 294 that extends downward to pass under the lower edge of the frame, as by being bent at right angles to form a U-shaped loop with an inside section 295, pivotally hung upon a screw 296 and held in a normal position by a spring 297, the action of the spring being checked by a stop-screw 298 in the lever 294 to strike the under edge of the frame. To check the down-stroke of the key 293, an arm 299 of the section 295 is bent over at right angles so that the free end may pass under the lower edge of the frame and contact therewith to limit the movement of said key. The section 295 is formed with an upright arm 300 arranged to engage with a trip-pawl 302 to raise the end of a rearwardly-extending bar 303 out of interlocking engagement with the comb-plate 291, to release said bar 303 to the action of a spring 304. The rear end of the bar 303 pivotally hangs from a crank-arm 305, depending from a rock-shaft 306 having end bearings in the frame. The rocking of the shaft 306 by the release of the bar 303 effects a rearward swing of a crank-arm 307 depending from said shaft with the end connected to a horizontally movable shift-bar 308 having its outer free end supported by a wall 309 of a switch-box 310. The rearward movement of the bar 308 vibrates a switch-arm 311 to close an electric circuit to a motor 312, operating to drive a shaft 313 and clutch elements 314, to rotate a pinion 315 in engagement with a rack 316 carried by the carriage 35 to mechanically restore the carriage rightward for a new line of print. At the end of this rightward movement of the carriage, suitable trips 317 and 318, one carried by the carriage, and the other mounted upon a rock-shaft 319 on a frame, and suitable connections between the two rock-shafts 319 and 306 effect a forward movement of the bar 308 to open the switch 311, and effect a forward movement of the bar 303 to restore its interlock with the plate 291. Further details of the power-driven carriage-return and connections are shown and described in my pending application, filed July 6, 1925, Serial No. 41,507 (now Patent No. 1,679,727, dated August 7, 1928). The present invention is concerned only with the key-actuated means to control the movement of the bar 303.

Figure 15 shows the key 293 depressed, the arm 300 swung forwardly, and the bar 303 lifted from the plate 291 and drawn rearwardly by the spring 304, to rock the shaft 306 and jointly effect the closing of the motor-circuit and lift the trip 318 into the path of the carriage trip 317. The bar 303 has an extension 320 that terminates in a horizontal tongue 320ª parallel with the bar, to engage a groove in a stud 321 fixed to an arm 322 fulcrumed at 323 to the side frame. The free end of the arm 322 is bent over at right angles toward the arm 300, as at 324, and said arm 300 also has a bent-over end, as at 325. When the arm 300 swings forward from the position of Figure 3, the end 325 moves forward, and as this forward movement progresses, the bar 303 is lifted from the plate 291, which raises the extension 320 to lift the stud 321 and cause the bent-over end 324 to pass to the rear of the end 325 to interlock therewith, and prevent a restoring movement of the key 293 when released.

It is desirable that the depression of the key 293 shall cooperate with the cams 196 and prevent actuation of the numeral-keys, backspace key, or the case-shift key during the power-driven carriage-return movement. To this end, the section 295 of the lever 294 has an arm 326 secured to the face thereof having a tongue 327 formed at right angles thereto, to provide a flat face to bear upon a roller 328 carried by the lever 217, and when the key 293 is depressed the lever 217 is swung about its pivot-screw 215 to swing the tongue 218 between the two members 204 and 205ª, to fill the working space between the series of cams 196 to prevent the actuation of any numeral-key, as shown at Figure 12.

It will be remembered that the depression of a tabulator-key 207 effects a locking-up of the keyboard by also vibrating the lever 217 to fill up the working gap within the cams 196, but the depression of a key 207, as shown at Figure 9, would not prevent the simultaneous depression of the carriage-return-key 293, which might result in injury to the carriage-stops, or other parts of the machine, and while the key-lever 294 might have suitable connections to co-operate with the cams 196, like the numeral-keys, in the present instance a simple connection is shifted by the tabulator-key to prevent the closing of the motor-circuit, and the depression of the key 293 becomes ineffective. As shown at Figure 9, each tabulator stop-bar 211 is cut away at one edge to form a one-way notch 329, to engage with a universal bar 330 hung upon a fixed fulcrum rod 331, and formed with side arms 332 with one free end bent outward to serve as an abutment stop 333. With the several parts positioned, as shown at Figure 3, the end of the bar 308 that projects beyond the wall 309 will pass over the stop 333, when the key 293 is depressed to start the motor, and the tabulator-key is locked up through the abutment of the stop 333 of the universal bar against the lower edge of the projecting bar 308. When the tabulator-key is depressed, as at Figure 9, the stop 333 is raised to intercept the rearward movement of the bar 308, and no carriage-return movement can take place.

The front of the actuator 49 may be provided with a cover plate 334 secured by screws 335 to cover the actuating mechanism down to the bottom of the partitions within the actuator-frame, thus leaving a working space between the lower edge of the cover and the tops of the keys 26 for the use of a brush in cleaning the faces of the type. This open space may be closed by a removable cover plate 336 formed with spring-clasps 337 at the inside face to pinch the edge of the usual front plate 338 of the machine, and be provided with a finger-knob 339 adjacent the upper edge of the plate, that may include a detent end 339ª to engage with a detent spring 340 secured to the back bar 50 of the actuator-frame. By drawing the knob 339 forward by the fingers, the plate 336 may be readily removed to give access to the types.

It will be particularly noted that the error or elimination lever 267 has connections to release the full-stroke devices from a semi-depressed numeral-key; that the actuation of said lever places a supplemental spring under tension to co-operate with the actuator-restoring spring 60 to effect the restoration of the actuating and carrying devices of the totalizer without increasing the normal tension of the numeral-keys to type or compute; that a non-print key becomes effective to prevent typing during a computing operation, without any disconnection of co-operating mechanisms; that the depression of a numeral-key automatically prevents a depression of the back-space key, the case-shift key, the tabulator-keys and the carriage-return-key; that the depression of the case-shift key automatically prevents actuation of the master-gear to compute during the typing of any upper-case non-numeral character on the numeral-type-bar; that the depression of any tabulator-key prevents the depression of a numeral-key, or the actuation of the carriage-return-key; that the depression of the carriage-return-key automatically locks the numeral-keys and prevents the depression of a tabulator-key; and that, with a keyboard surrounded by such extensive interlocking safety and preventive devices, mistakes in manipulation of the keys that are liable to tangle up the computing mechanism are largely eliminated.

Variations may be resorted to within the scope of the invention, and portions of the improvements may be used without others.

Having thus described my invention, I claim:

1. In a computing machine, the combination of a master gear, a master dog and a totalizer, the totalizer being movable relatively to the master gear and the master dog, and the totalizer including a series of digit wheels, a series of carrying gears, and carrying-over units for the carrying gears, spring-pressed carrying unit supporting arms operated seriatim by the master dog, a safety-bar operable to lock the series of supporting arms when one arm is actuated by the master dog, a toothed-centering arm for the carrying gear of lowest denominational order operated by the master dog, and a pair of toothed-centering arms operated by the safety-bar, one arm to correct the toothed alignment of the carrying gear of the highest denominational order, and the other arm to correct the alignment of an intermediate carrying gear.

2. In a computing mechanism having a totalizer, spring-restored numeral-keys, and totalizer-actuators connected to the numeral-keys; the combination of a full-stroke device including ratchet-teeth on each actuator and also including a longitudinal locking pawl common to the ratchet-teeth of all the actuators, a restoring key having means operable to lift said pawl from the teeth of its partially moved actuator to release the actuator, and a spring flexed by the restoring key in lifting said pawl and operatively connected to supplement the numeral-key spring, to restore its actuator.

3. In a computing machine having a totalizer-mechanism, spring-restored numeral-keys, and totalizer-mechanism-actuators positively connected to the numeral-keys and normally restored by said keys when disconnected from said totalizer-mechanism, the combination of a full-stroke mechanism including ratchet-teeth on each actuator and also including a single check-pawl universal to the ratchet-teeth of all the actuators, to prevent the premature return of any actuator and its connected totalizer-mechanism before a full depression of a numeral-key, a release-key having means operable to lift the check-pawl, at will, from the teeth of each actuator, and a spring flexed by the release-key and operatively connected to the numeral-keys to supplement the spring of the partially depressed numeral-key, to restore its actuator and the connected totalizer-mechanism to normal positions.

4. In a computing machine having type-operating numeral-keys, a printing mechanism including a printing frame key-shiftable for upper and lower case printing and also having a totalizer train of mechanism disconnected from the numeral-keys, an actuator individual to each numeral-key and permanently connected thereto, controlling means engageable by each actuator and having connections effective to connect the totalizer train with the numeral-keys to compute, and full-stroke devices including a long pawl normally engaged with all the actuators to insure a full depression of any numeral-key; the combination of a train of mechanism rendered operable by the case-shift movement of the printing frame, and having means effective to prevent the actuation of the totalizer-controlling means by any numeral-key and also disengage the long pawl from said actuators to silence both the totalizer-controlling means and the full-stroke devices, to permit the actuators to be moved idly by the keys, while the printing mechanism is operative at a case-shifted position.

5. In a computing machine having type-operating numeral-keys, a printing mechanism including a printing frame case-shiftable by a key, and also having a totalizer train of mechanism disconnected from the numeral-keys, an actuator individual to each numeral-key and permanently connected thereto, a full-stroke device co-operative with all the actuators, and controlling means rockable by each actuator and effective to connect the totalizer train to the numeral-keys before a computative operation; the combination of a train of mechanism spring-operated to follow the case-shift movement of the printing frame and having a two-part terminal, one terminal effective to engage and disable the actuator-rocked totalizer-controlling means to silence the totalizer, and the other terminal effective to engage and disable the full-stroke device for all the actuators, to permit the actuators to be moved idly by the keys while the printing frame is case-shifted and the numeral-keys are not computing.

6. In a computing machine having a computing mechanism including numeral-keys having restoring springs, actuators individual to the numeral-keys, a totalizer train of mechanism connectible to be driven by each actuator, and a full-stroke device having means operable to check the return of any actuator before a full depression of a numeral-key, the combination of a release key having connections effective to release said full-stroke device, a universal bar depressible by each numeral-key, and a slack spring intermediate the universal bar and the release key so disposed that the depression of said release key will tension the slack spring and cause it to aid the key-restoring spring in returning the actuator.

7. In a typewriting machine, including a shiftable platen-frame and typing elements having upper and lower case characters, numeral-keys, a cam-actuator for each numeral-key operable to first condition the master gear and then differentially rotate the gear to compute, a full-stroke device to force a full actuation of any numeral-key, and means operable by the case-shifting movement of the platen-frame to jointly render the full-stroke device and the master gear inoperative at the depression of a numeral-key.

8. A combined typewriting and computing mechanism including a carriage, a totalizer, numeral-keys, a master gear for operating the totalizer-trains connected to the numeral-keys, mechanism common to said keys and actuators for driving the master gear, a full-stroke device common to said actuators to prevent the return of any partially operated key, an error-key common to said actuators, means to enable said error-key to move said full-stroke device to release position to free any partially driven actuator, and means called into action by said error-key to aid in restoring the key, the actuator, the master gear, and the active totalizer train or trains to their various initial positions, thereby taking out of the totalizer the partial amount that was run into it by the partially depressed key.

9. A combined typewriting and computing mechanism including a carriage, a totalizer, numeral-keys, a master gear for operating the totalizer-trains connected to the numeral-keys, mechanism common to said keys and actuators for driving the master gear, a full-stroke device common to said actuators to prevent the return of any partially operated key, an error-key common to said actuators, means to enable said error-key to move said full-stroke device to release position to free any partially driven actuator, and means called into action by said error-key to aid in restoring the key, the actuator, the master gear, and the active totalizer train or trains to their various initial positions, thereby taking out of the totalizer the partial amount that was run into it by the partially depressed key, said error-key mechanism including a supplemental spring which is tensioned by the error-key and thereupon tends to return the numeral-key, master gear and totalizer-train.

ALFRED G. F. KUROWSKI.